United States Patent [19]

Turner

[11] Patent Number: 5,071,280
[45] Date of Patent: Dec. 10, 1991

[54] SLANT AND SKEW NAILING DEVICE

[76] Inventor: Arthur R. Turner, 9, The Parapet, Terranora, New South Wales 248, Australia

[21] Appl. No.: 584,897

[22] Filed: Sep. 19, 1990

[30] Foreign Application Priority Data

Sep. 6, 1990 [AU] Australia .............................. 62223/90

[51] Int. Cl.⁵ .............................................. F16B 9/00
[52] U.S. Cl. .................. 403/232.1; 403/283; 411/466; 411/461; 52/702
[58] Field of Search ...................... 403/232.1, 283, 237; 52/702, 712, 714; 411/457, 461, 466, 467, 468

[56] References Cited

U.S. PATENT DOCUMENTS

| | | | |
|---|---|---|---|
| 2,937,418 | 5/1960 | Sanford | 411/466 X |
| 3,498,171 | 3/1970 | Jureit | 411/466 X |
| 3,501,181 | 3/1970 | Jureit | 411/466 X |
| 3,601,428 | 8/1971 | Gilb | 403/232.1 |
| 4,198,175 | 4/1980 | Knepp et al. | 403/232.1 X |
| 4,291,996 | 9/1981 | Gilb | 403/232.1 X |
| 4,480,941 | 11/1984 | Gilb et al. | 403/232.1 |
| 4,802,786 | 2/1989 | Yauger et al. | 403/232.1 |
| 4,920,725 | 5/1990 | Gore | 403/232.1 X |

Primary Examiner—Peter M. Cuomo
Attorney, Agent, or Firm—Harry M. Weiss

[57] ABSTRACT

A sheet metal connector is provided for use with timber building components of the type that has nails to be driven through the sheet metal into the timber. The connector has substantially U-shaped cuts in the sheet metal to define nailing tongues. The nailing tongues have a deformation for use in providing a nail entry point so that a nail driven therethrough will serve to drive the nailing tongue into the timber.

8 Claims, 2 Drawing Sheets

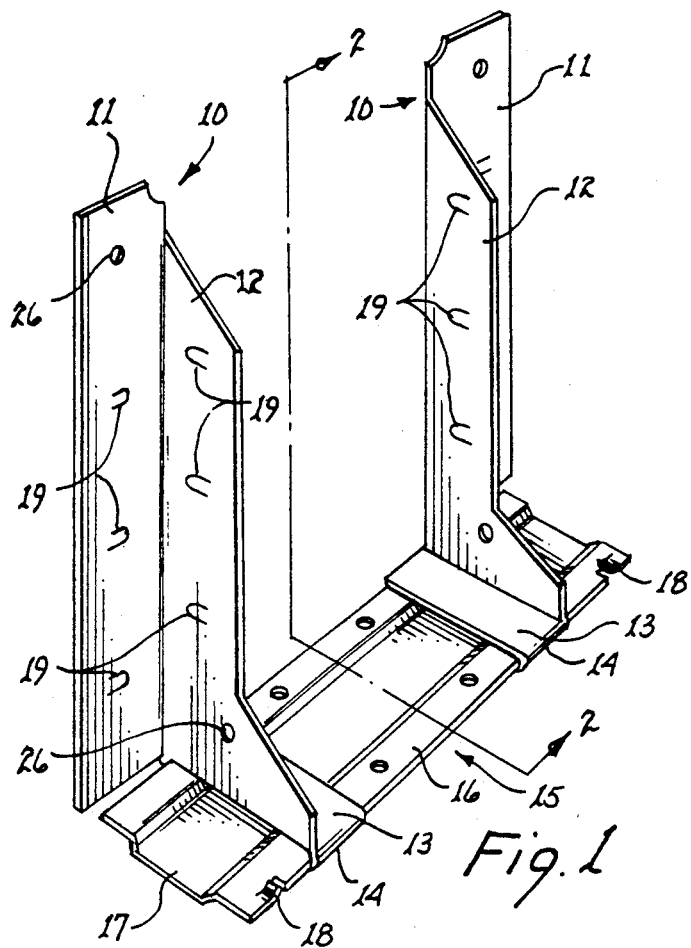
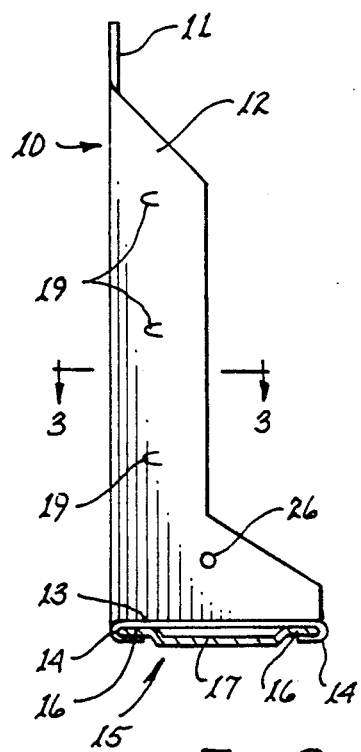
Fig. 1
Fig. 2
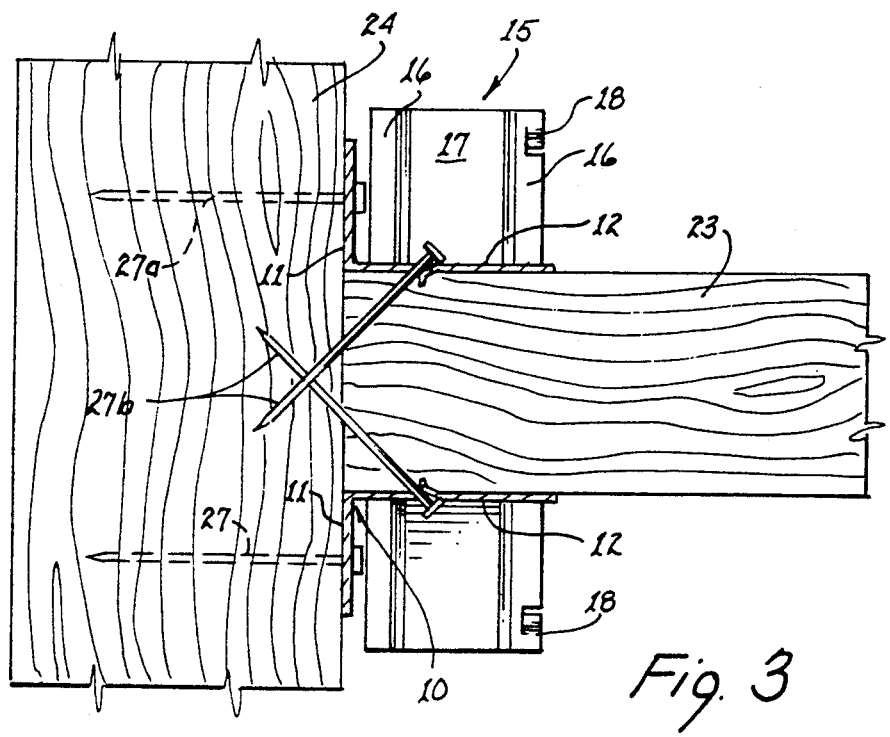
Fig. 3

SLANT AND SKEW NAILING DEVICE

This invention relates to connectors for timber building components.

A very wide range of sheet metal connectors are available and widely used for firmly connecting together various component parts of a timber frame of a house or other building. Such connectors are normally of galvanized sheet steel and are shaped for fitting against the members to be connected and are formed with holes through which nails can be driven into the parts to be interconnected. Typical connectors of this character include joist hangers, strap hangers for roof trusses and I-beams, truss spacers, tie plates, framing anchors, angle braces and flat wall braces, framing anchors, angles and gussets and many more. In many cases the disposition of the timber components is such that it is very advantageous for them to be interconnected by skew nailing through the connectors so that the shear strength of the connection is greatly improved. It is already known for connectors such as joist hangers, for connecting one timber component such as a joist perpendicularly to another component such as a beam, to press tongues outwards from connector flanges which are to be nailed to the joist, each such tongue, and the hole left in the metal from which it has been pressed, forming a guide for a nail to ensure that it will be driven at an angle of 45° or other predetermined angle to ensure an effective skew-nailing connection of the two timber components. These guiding tongues have the disadvantage however that they prevent nails being driven at any but the predetermined angle, though in many cases it may be desired to drive nails at some other angle, or perpendicularly into the component adjacent to the connector.

The present invention has been devised with the general object of providing, in a sheet metal connector, for timber building components, guiding means for nails driven through the connector into the timber which permit a nail to be driven in any of a range of angles to the timber component and, after the initial penetration of the nail, to guide it along the chosen path, and at the same time contribute to the shear strength of the nailed connection.

With the foregoing and other objects in view, the invention resides broadly in a sheet metal connector for timber building components of the type having openings for nails to be driven through the sheet metal into the timber components wherein substantially U-shaped cuts in the sheet metal define nailing teeth; tongues; each nailing tooth is made with a deformation such that its distal end extends inwardly from the plane of the surrounding sheet metal in the direction of the timber component to which the connector is to be adjacent when the connector is nailed thereto; the inward deformation at the distal end of the nailing tooth providing a nail entry point; the nailing tooth being such that a nail driven through the nail entry into the timber component will drive the nailing tooth into that component. The inward deformation of the nailing tooth is preferably at its distal part only, the remaining or major part of the nailing tooth being coplanar with the surrounding sheet metal. The nailing tooth preferably terminates in a V-shaped point and is formed with a central longitudinal groove. Other features of the invention will become apparent from the following description.

In order that a preferred embodiment of the invention may be readily understood and carried into practical effect, reference is now made to the accompanying drawings, wherein:

FIG. 1 is a perspective view of a joist hanger with nailing teeth according to the invention;

FIG. 2 is a side elevational view of the joist hanger;

FIG. 3 is a sectional view, to larger scale, taken along line 3—3 in FIG. 2 and showing the joist hanger nailed to a joist and beam;

Figure 4:
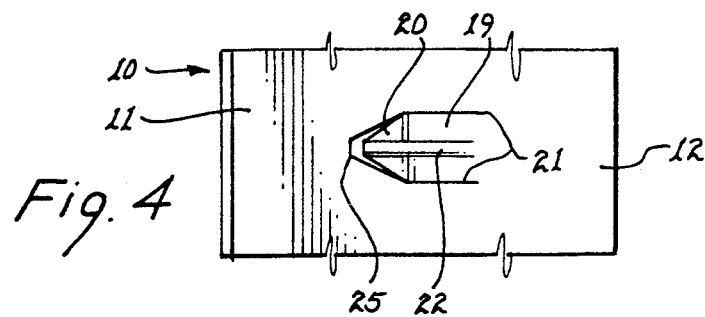
FIG. 4 is a side elevational view to further enlarged scale showing part of the joist hanger and one of its nailing teeth.

The joist hanger shown in the drawings includes two oppositely arranged but otherwise similar side brackets 10, each of, preferably, galvanized sheet steel, and having a beam attachment flange 11 and a joist attachment flange 12, the two flanges being perpendicular. The lower part of the joist attachment flange is increased in width and formed with a rectangular extension of still greater width which is shaped to form a platform guide 13 by bending it perpendicularly to the flange and forming oppositely directed U-bends 14 at its ends. An elongated rectangular platform 15, with side edge portions 16 at a higher level than its middle part 17, is slidably engaged in the U-bends of the two oppositely directed platform guides 13, and stops 18, made by deforming parts of the ends of the platform, prevent either of the side brackets from becoming accidentally disengaged from the platform.

Figure 5:
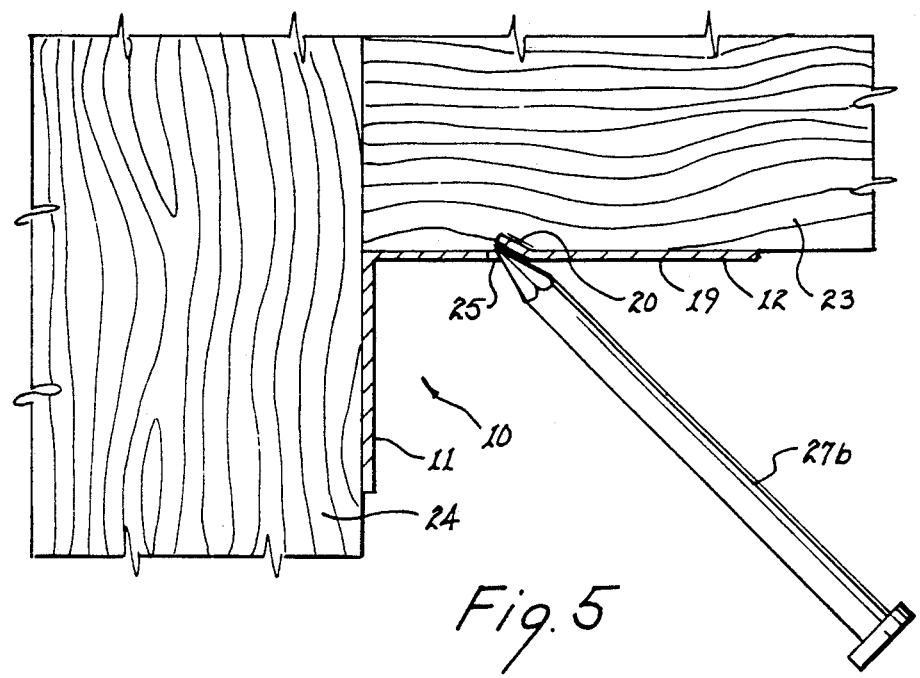
FIG. 5 is a cross-section showing in plan view a nail about to be driven through the joist hanger to skew-nail a joist to a beam.
Figure 6:
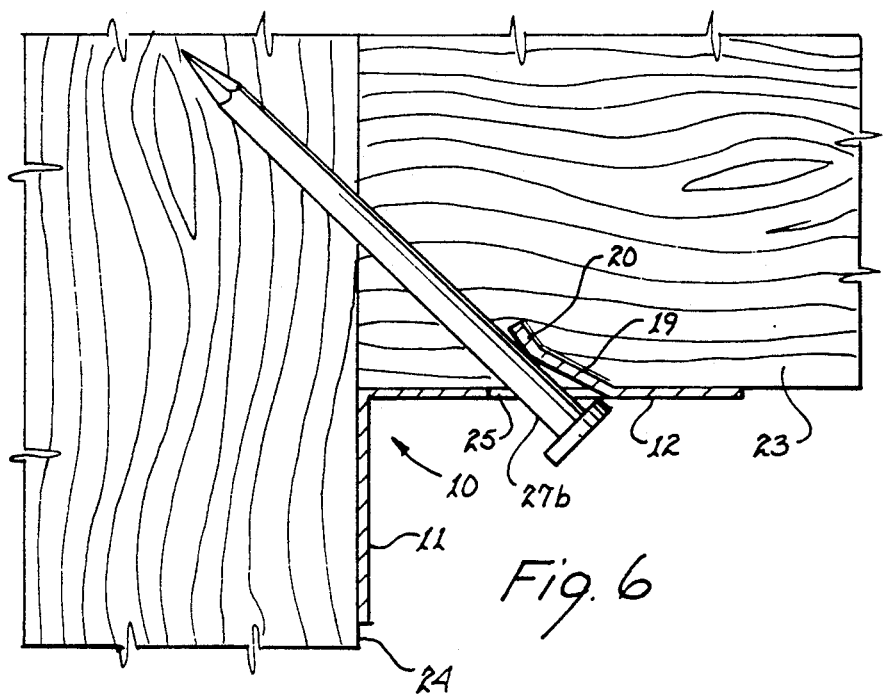
FIG. 6 is a view similar to FIG. 5 but with the nail fully driven.

According to the invention, there are formed in the flanges 11 and 12 of both side brackets a number of substantially U-shaped cuts each of which defines a nailing tooth 19 which, as shown particularly in FIGS. 4 and 5, has a V-shaped extremity 20 extending from parallel sides 21. Each nailing tooth is formed with a longitudinal guide groove 22 from its root to its point, and its V-shaped distal end 20 is bent inwardly so as to project slightly from the side of the flange which will be positioned against a joist 23 or beam 24 to be connected. This deformation of the point of the nailing tooth away from the sheet metal from which it was pressed results in a small opening at 25.

The flanges 11 and 12 of the side brackets 10 may also be formed with any desired arrangement of circular nail holes as indicated at 26 so that the joist hanger may be initially supported by nailing it to the beam 24 and to the joist 23 through these holes. Then, as shown in FIG. 3, nails 27a may be driven through the beam attachment flanges 11 of the appropriately spaced side brackets 10 of the joist hanger and perpendicularly into the beam; and nails 27b may be skew nailed into the joist and into the beam 24. In each case, the opening 25 at the extremity a nailing tooth provides a point of entry of the nail, and the nailing tooth is deformed into the timber of the beam or joist by the advancing nail, whether the nail is driven perpendicularly or obliquely with respect to the timber component. The initial angle of entry of a nail, and therefore the angle of penetration of the nailing tooth, can be determined by the workman carrying out the operation, and once the tooth has been driven into the timber it will, with the hole through which the nail is driven, help to ensure that the nail as it is fully driven does not significantly depart from this angle of entry. The driving of the nailing tooth into the timber of the connected components will contribute materially to the shear strength of the connection.

It will be apparent that nailing teeth according to the invention may be applied to a very wide range of connectors for timber building components. Minor modifications of constructional detail and design are considered to lie with the scope of the invention hereinafter claimed.

I claim:

1. A sheet metal connector for joining timber building components requiring skew nailing of the type having sheet metal flat segments engaged against each of the timber components being joined, the segments being provided with openings for nails to be driven through the sheet metal into the timber components, said sheet metal connector comprising:

at least one of said segments being provided with substantially U-shaped elongate cuts in the sheet metal to establish nail entry points, the nail entry points existing between each base of the U-shaped cuts and nailing tongues, each of said nailing tongues being a tongue of sheet metal defined by each of the U-shaped cuts;

each of said nailing tongues being bent such that its distal end extends inwardly from the plane of the surrounding sheet metal in the direction of one of the timber components to which the connector is adjacent when the connector is nailed thereto;

each inward bent of each of said nailing tongues exposing at the distal end of each of the nailing tongues the thickness of the sheet metal at each base of the U-shape cuts to catch a point of a nail applied thereto to define said nail entry points;

each of said nailing tongues being driven into and extending into each of the timber components by a nail driven through each of the nail entry points into each of the timber components.

2. A sheet metal connector according to claim 1 wherein:

a greater part of each of the nailing tongues is coplanar with the surrounding sheet metal, each of the nailing tongues being deformed near to its distal end to establish each of the nail entry points.

3. A sheet metal connector according to claim 2 wherein:

each of said U-shaped cuts is such that the distal end of each of the nailing tongues terminates in a V-shaped point.

4. A sheet metal connector according to claim 3 wherein:

each of the nailing tongues is formed with a central longitudinal groove.

5. A sheet metal connector according to claim 2 wherein:

each of the nailing tongues is formed with a central longitudinal groove.

6. A sheet metal connector according to claim 1 wherein:

each of said U-shaped cuts is such that the distal end of each of the nailing tongues terminates in a v-shaped point.

7. A sheet metal connector according to claim 6 wherein:

each of the nailing tongues is formed with a central longitudinal groove.

8. A sheet metal connector according to claim 1 wherein:

each of the nailing tongues is formed with a central longitudinal groove.

* * * * *